5 Sheets—Sheet 1.

F. E. HERDMAN.

ELECTRICALLY OPERATED ELEVATOR

No. 11,409. Reissued Mar. 27, 1894.

Witnesses.

Frank S. Busser

M. Frances Ellis

Inventor.

Frank E. Herdman by G. H. Harding

Attorney.

THE NORRIS PETERS CO., WASHINGTON, D. C.

5 Sheets—Sheet 2.
F. E. HERDMAN.
ELECTRICALLY OPERATED ELEVATOR
No. 11,409. Reissued Mar. 27, 1894.
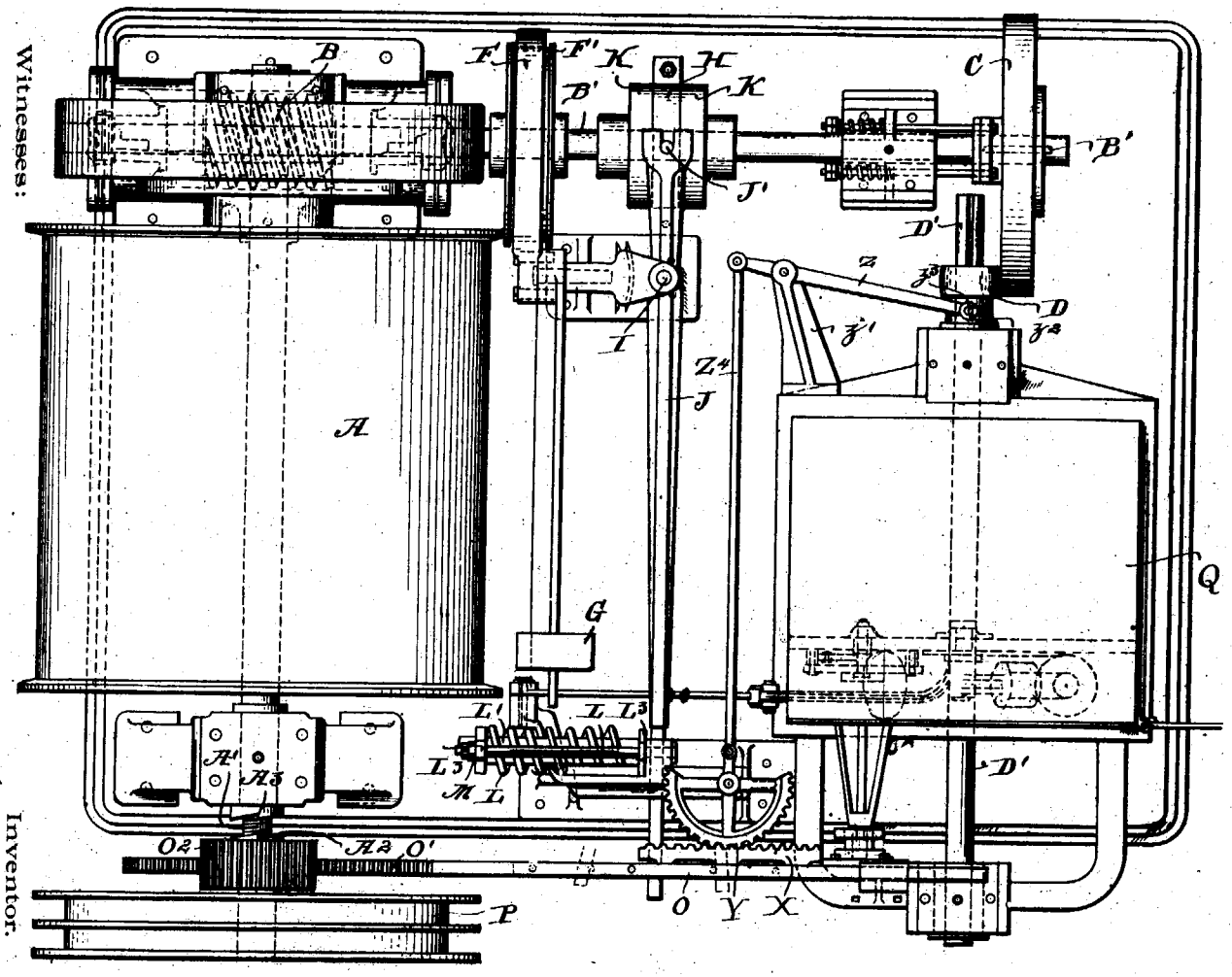
Witnesses:
Frank A. Busser
M. Frances Ellis
Inventor.
Frank E. Herdman
E. G. Hindley
Attorney.
THE NORRIS PETERS CO., WASHINGTON, D. C.

5 Sheets—Sheet 3.
F. E. HERDMAN.
ELECTRICALLY OPERATED ELEVATOR
No. 11,409. Reissued Mar. 27, 1894.
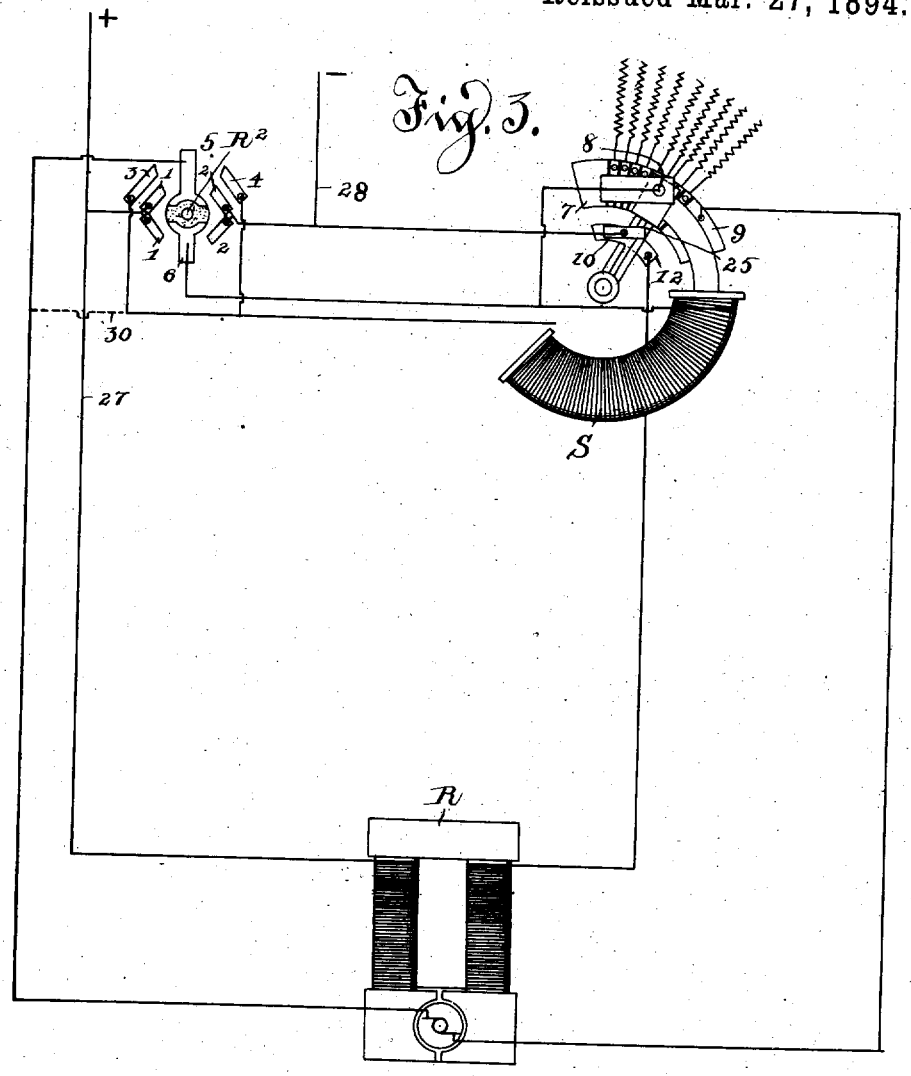
Witnesses.
Frank S. Brown
M. Frances Ellis
Inventor.
Frank E. Herdman
by G. P. Harding
Attorney.
THE NORRIS PETERS CO., WASHINGTON, D. C.

5 Sheets—Sheet 4.
F. E. HERDMAN.
ELECTRICALLY OPERATED ELEVATOR
No. 11,409. Reissued Mar. 27, 1894.
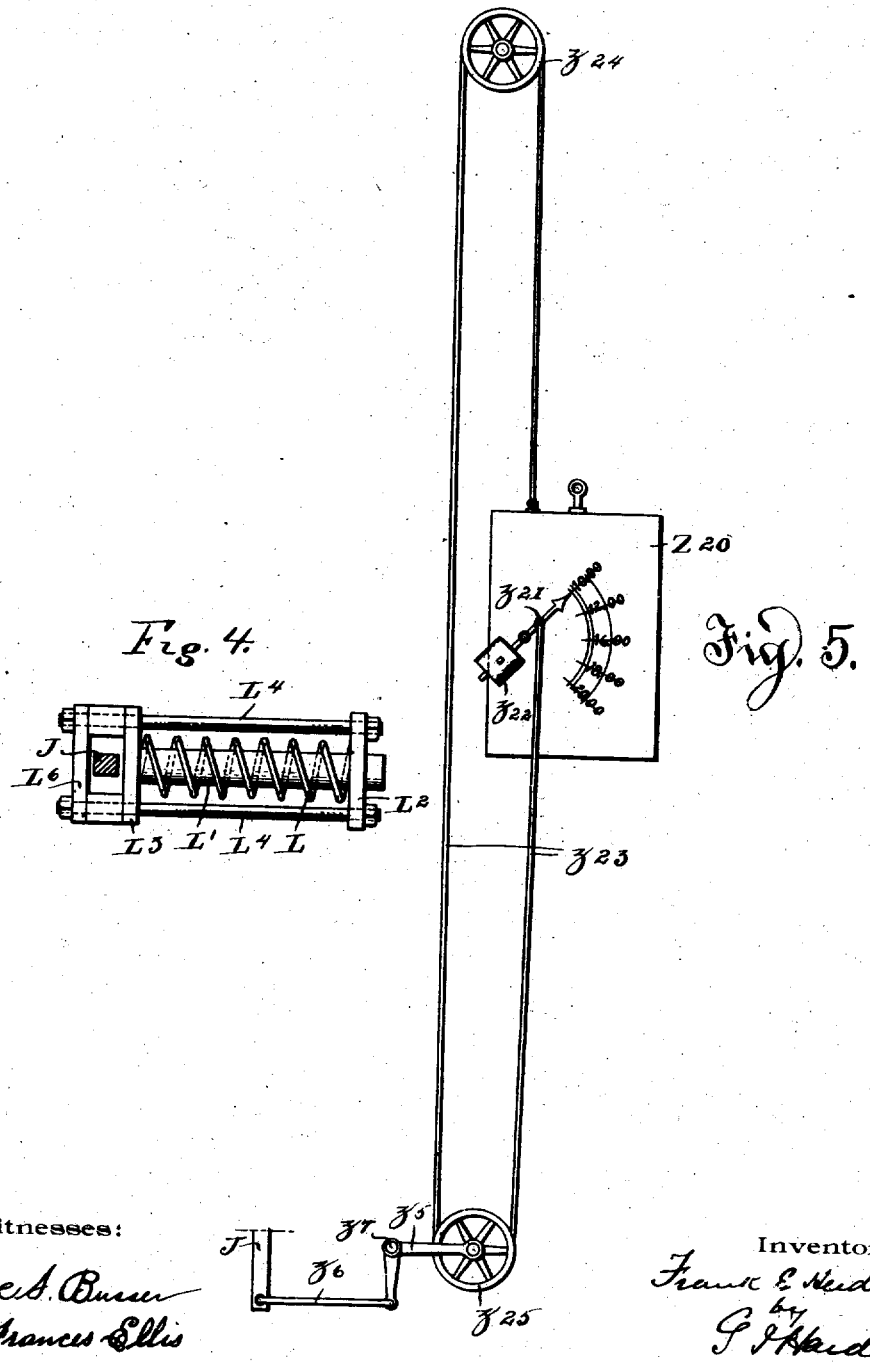
Witnesses:
Frank A. Busser
M. Frances Ellis
Inventor.
Frank E. Herdman
by
G. F. Harding
Attorney.
THE NORRIS PETERS CO., WASHINGTON, D. C.

F. E. HERDMAN.

ELECTRICALLY OPERATED ELEVATOR

No. 11,409. Reissued Mar. 27, 1894.

Witnesses:

Frank A. Busser

M Frances Ellis

Inventor.

Frank E. Herdman by G. A. Harding

Attorney.

THE NORRIS PETERS CO., WASHINGTON, D. C.

UNITED STATES PATENT OFFICE.

FRANK E. HERDMAN, OF WINNETKA, ILLINOIS, ASSIGNOR TO THE PREMIER STEEL COMPANY, OF INDIANA.

ELECTRICALLY-OPERATED ELEVATOR.

SPECIFICATION forming part of Reissued Letters Patent No. 11,409, dated March 27, 1894.

Original No. 466,037, dated December 29, 1891. Application for reissue filed January 23, 1894. Serial No. 497,813.

DIVISION B.

*To all whom it may concern:*

Be it known that I, FRANK E. HERDMAN, a citizen of the United States, residing at Winnetka, in the county of Cook, and State of Illinois, formerly residing at Indianapolis, county of Marion, and State of Indiana, have invented a new and useful Improvement in Elevators, of which the following is a full, clear, and exact description, reference being had to the accompanying drawings, which form a part of this specification.

Figure 1:
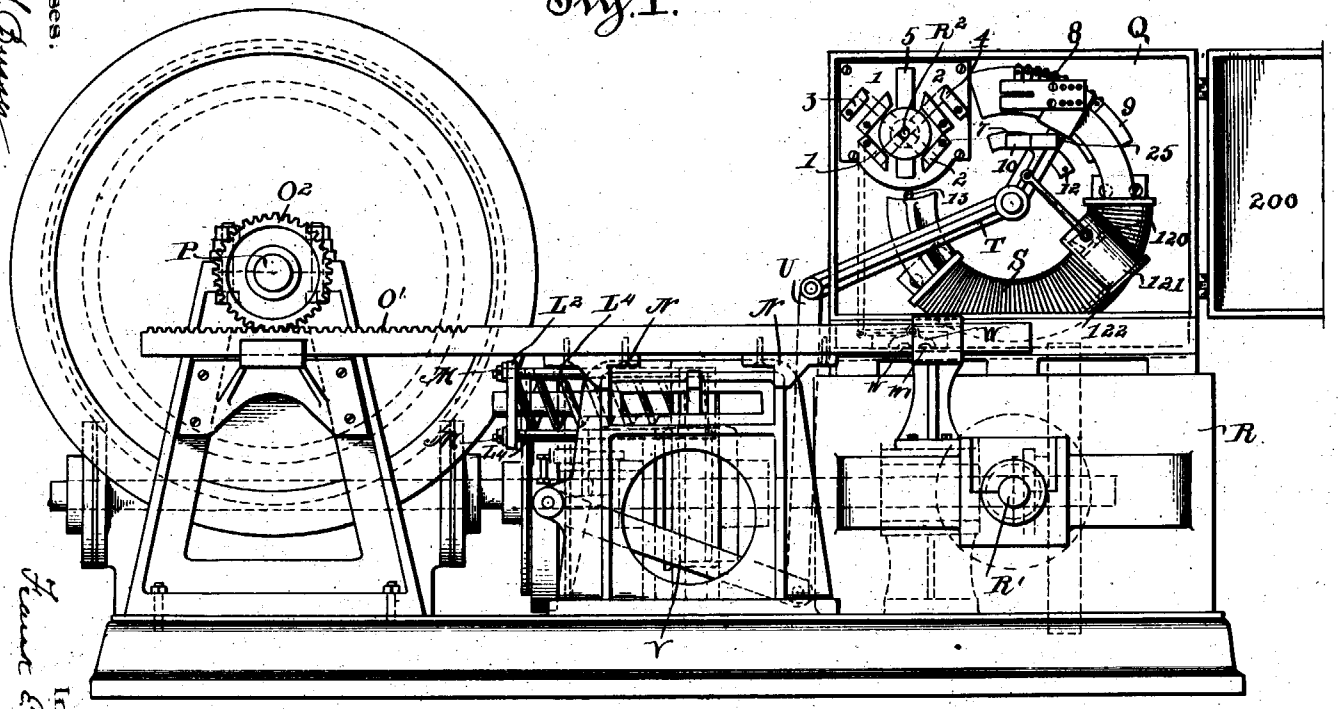
Figure 6:
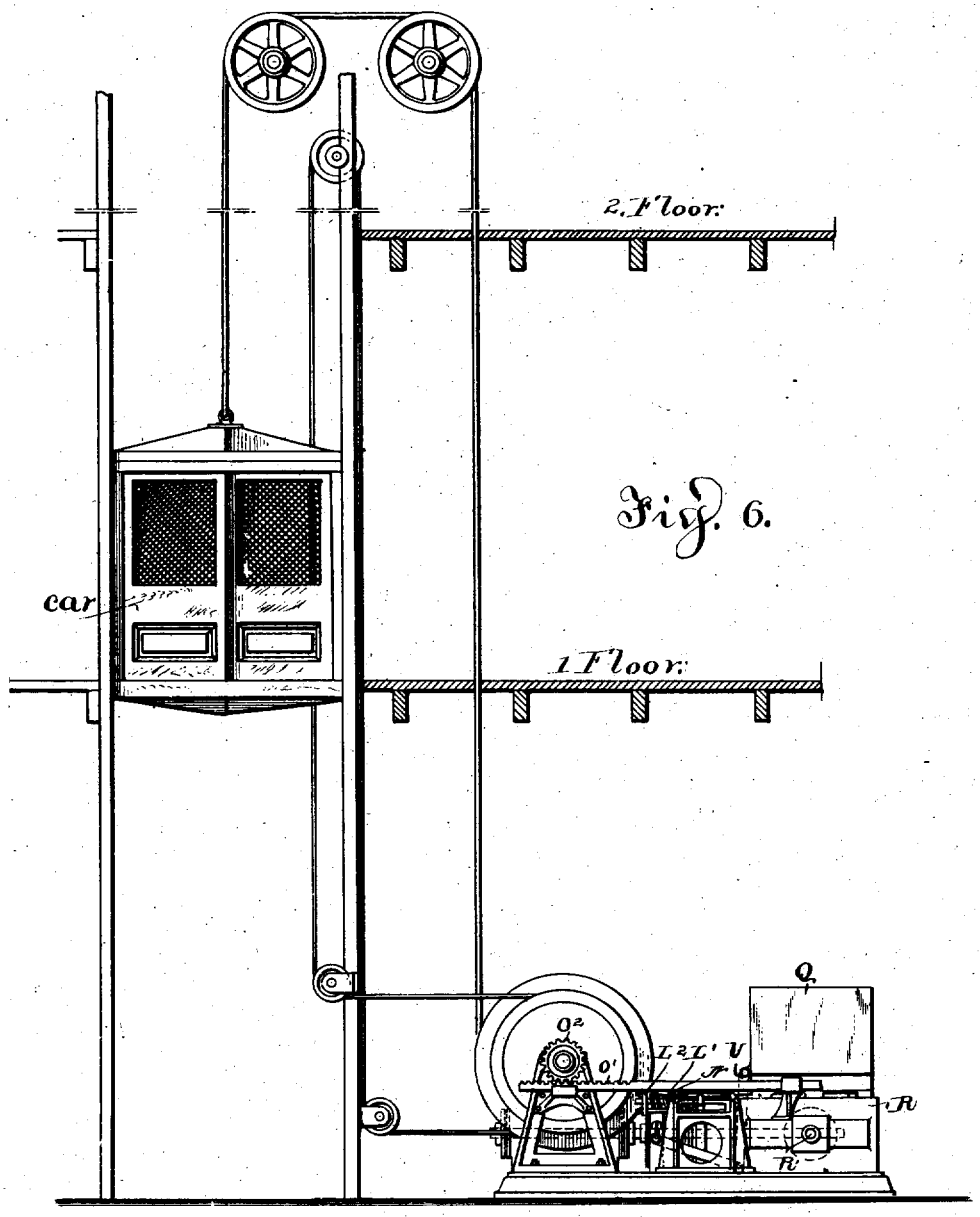

In the drawings, Figure 1 is a side elevation of elevator operating mechanism. Fig. 2 is a plan view of same. Fig. 3 is a diagrammatic view of solenoid, switches and motor. Fig. 4 is a detail sectional view of weighing-lever tension apparatus. Fig. 5 is a detail view of indicating device in connection with weighing lever. Fig. 6 is a front elevation of elevator and operating mechanism for the same.

Similar letters and figures denote similar parts.

A is the operating drum, driven by the worm B on the shaft B′. On the other end of the shaft is the friction-wheel C, which is sleeved on the shaft B′, and is provided with the tension device, which in this case is a spring, although a weighted lever may be substituted for the spring.

D′ is the driving shaft, and sleeved upon said shaft is the friction wheel D.

Z is a lever fulcrumed at $z$, which is connected to the support $z'$. This lever Z has the forked end $z^2$, which surrounds the pin $z^3$, connected to the sleeve of the friction-wheel D.

$Z^4$ is connecting-rod connecting the lever Z and the gear-wheel Y, the gear-wheel Y working in the rack X, which is upon the operating-bar O. This bar terminates in the rack O′, which works in the gear-wheel $O^2$ upon the shaft of the operating sheave P.

F′ is a wheel upon the shaft of the worm B, and F is the brake, having the weight G at the end of its lever.

H is a loose collar between the fixed collars K K upon the worm-shaft B′.

J′ is a pin upon the loose collar H, and J is a lever provided with the forked end which surrounds the pin J′. I do not limit myself to the exact connection between the worm end lever J, except wherein the same is specifically claimed. The lever J is fulcrumed at I, and the end-thrust of the movement of the worm or screw in either direction is taken up by this loose collar H, and the movement of this loose collar tends to move the lever J in either direction—that is, to the right or to the left. Near the lower end of the lever J is attached a spring L, which surrounds the rod L′.

$L^2$ $L^3$ are two yokes which surround the rod L′, the yokes $L^2$ being loose upon the rod L′ and the yokes $L^3$ fixed. These yokes are connected together by the rods $L^4$, and the rods $L^4$ pass through the yoke $L^3$ and through the yoke $L^6$ and are connected to yoke $L^2$.

The lever J passes between the yokes $L^3$ and $L^6$, so that the movement of the lever J tends to compress the spring L—that is, the movement of lever J has to be against the spring L. The amount of tension or the amount of power exerted by this spring is regulated by turning the nuts M on the end of rods $L^4$, which compresses more or less the spring L by moving studs $L^2$ and rod L′.

N N are two stops on the operating-bar O.

By means of the lever J I am enabled to regulate the operation or movement of the elevator, so as to prevent its becoming overloaded. Thus, if fifteen hundred pounds is the capacity of the machine at its highest speed the spring would be tightened by the nut M until the lever J would be left in its central position with this load, and the operator could then move the friction wheel D to its greatest throw—that is, so as to get the greatest differential speed between the shaft of the motor or the friction wheel D and the friction wheel C. If the load become greater than fifteen hundred pounds, the throw of the worm wheel B would cause the lever to move to the left, thus limiting the throw of the operating-bar O, as the throw would be limited by the stop N striking the bar J, and this would consequently reduce the speed of the elevator to correspond with the increased load, thus preventing the overloading of the electric motor, or the overloading of the engine, if it be driven directly by an engine, or the overloading of the motive power, whatever it may be, and when the load is decreased the spring L returns lever J. As power exerted is the load multiplied by the speed, if, therefore, when the load is increased I proportionately decrease the speed, I bring the power multiplied by the speed always to a constant. This may be used in any elevator, whether driven by the means to be hereinafter described in this particular device—to wit, an electric motor—or in any device for producing the power—that is, it may be used equally with a steam motor, an engine, or with a hydraulic motor, the purpose being simply to cause the speed multiplied by the power to be a constant. As will be hereinafter described, if the elevator becomes too greatly overloaded, so as to reach the danger limit, the elevator will be stopped by the extreme movement of the bar O. In this case I could use a weighted lever in place of the spring, so that the lever J would remain inactive until the danger limit was reached, and when this occurs the weight would be overbalanced and the lever rendered active and would move the operating-bar, so as to stop the elevator. If desirable, an indicator could be placed in the car, so as to indicate the extent of the load—that is, the extent to which the load increases over the normal at which the lever is set—as shown at Fig. 5, in which $z^{20}$ is an indicator in the car, having graduations.

$z^{21}$ is a pivoted index finger weighted at $z^{22}$.

$z^{23}$ is a cord, one end connected to the indicator, and passes over pulleys, $z^{24}$ $z^{25}$, and the other end is connected to index finger.

$z^5$ is a bell-crank-lever, one end connected to pulley $z^{25}$, and the other end connected to rod $z^6$, which rod in turn is connected to lever J. The bell-crank $z^5$ is fulcrumed at $z^7$. As the pulley $z^{25}$ is raised or lowered the index travels around its center and is brought opposite the different indicating numbers, and the parts are so adjusted that the movement of lever J for an increase of load moves the index a distance to indicate the change.

In order to provide an automatic stop at the end of the travel of the elevator, I construct the operating-sheave P so that it works in a thread on the drum shaft A′, so that the movement of the drum-shaft moves the sheave upon said shaft. The hub of the operating-sheave is provided with the toothed portion $A^2$, and the drum shaft A′ is provided with the toothed portion $A^3$, which are so adjusted that when the drum has received sufficient cable to bring the car to the end of its travel the operating-sheave has moved upon the shaft, so that the tooth on the sheave strikes the tooth on the shaft of the drum, and the sheave is revolved with the shaft, stopping the mechanism.

The speed of the elevator is increased or decreased by turning the sheave P, which in turn operates the operating-bar O, which operates the rack X in the gear Y, moving the lever Z so as to move the friction wheel D up and down the face of the friction wheel C, the friction wheel C being held by the springs hereinbefore described in close contact with the friction wheel D. The operating-motor in this case is an electric motor, and is operated in the following manner: R is the electric motor which has the shaft R′ connected to it, which shaft is connected to the shaft of the friction wheel D or forms the shaft for the friction-wheel D. The operation of this motor is as follows: Q is a resistance box interposed between the motor and the source of current-supply, and $R^2$ is the switch by means of which the current is turned on or off. The wires from the main circuit are connected to the brushes 1 1 and 2 2. S is a solenoid, the said solenoid being in electrical connection with the brushes 3 and 4, as clearly shown in the diagrammatical sketch. 5 and 6 are two contacts on the switch, the wire from 5 passing directly to the pole of the armature of the motor and the wire from 6 passing to the brush 8, and a wire passes from the other pole of the armature of the motor to the contact-plate 9. The brush 8 is insulated from and connected to the core of the solenoid and moves with said core. The main current also passes from one pole to the magnet of the electric motor and from the other pole to the brush 10. The other magnet of the electric motor is connected to the contact-plate 12. The brush 10 is connected to and insulated from the arm which carries the brush 8. 7 is an insulated plate upon which the brush 8 rests when the current is off. The switch $R^2$ is connected to the cam W, which is operated by two pins $w$, $w'$, on the operating-arm O. T is a lever which is connected to the arm 25, to which the brushes 10 and 8 are connected and to which the core of the solenoid is also connected, and U is a connecting-rod which connects the lever T with the rod V, said rod V being connected to the brake G, and these parts are so connected that the weight G normally holds the solenoid core in the position shown in drawings—that is, holds the solenoid core out of action. When the operator moves the operating bar O through the medium of the cam W, the switch $R^2$ is moved so as to bring the contacts 1 1 and 2 2 (according to the direction in which the switch is moved) into contact with either the brush 5 or brush 6, and also to bring the brush 5 into connection with the brush 3 or 4. This allows the current to pass along the wire from 3 (supposing the switch to be turned to the left) through the magnet of the solenoid, electrifying said magnet and causing it to draw the core in. The current passes through the medium of the brush 5 to one pole of the amature of motor and through the medium of the brush 6 to the brush 8, through the resistance-coil to the contact-point 9, and through that to the other pole of the armature of the electric motor. As the brush 8 on the solenoid core travels over the rheostat of the resistance the resistance becomes less and less until the brush 8 comes directly over the contact 9, when the current passes directly to the motor without passing through the resistance-coil. The field current is carried in the same manner by means of the wire 27, which passes to one of the magnets, and the other wire 28 passes to the brush 10, which is brought into contact with the contact-point 12, which contact-point 12 is electrically connected with the other magnet. (The speed with which the solenoid acts is governed by a dash-pot consisting of a piston 120, connected at 25, the piston working in the cylinder 121, which is provided with a small air outlet 122). The current is thus enabled to be carried onto the armature of the motor, gradually preventing any sudden influx of the current. When it is desired to stop the machine and turn off the current, the reverse occurs—that is to say, the lever T is provided with the projection 11, which is in the path of the projection 13 on the switch, and when the switch is reversed these parts are so adjusted that the point 13 comes in contact with the projection 11 before the contact-point 5 has passed beyond the brush 1, but after it has passed beyond the brush 3, which will cause the current to be cut off from the solenoid-magnet, which will cause the weight of the brake F to pull back the solenoid core, and thus draw in the resistance with the armature before the reversal takes place—that is, it will be impossible under this construction to change the direction of the motor without bringing it to a rest. To stop the motor, the operator turns or moves the bar O in the opposite direction, which moves the switch, so as to bring the brush 5 away from the brush 3, which causes the solenoid to drop back, bringing more and more resistance into the circuit until the brush 8 has reached the point 7, which is insulation, which will prevent any current passing through that way. The brush 10 also passes beyond the contact-plate, which will also throw the field-current out of electrical connection, and these brushes 5 and 6 are brought into the position shown in the drawings when the motor is at rest. By this connection of the solenoid-core with the brake of the machine I am enabled to stop the machine whenever the current is cut off—that is, to make an automatic brake whenever the current is stopped.

In place of connecting the solenoid magnet by means of the brushes 3 or 4, I can, if desired, connect the solenoid magnet with the main current, as shown in the dotted lines 30. The projection 11 on the solenoid core in this case would also prevent a reversal of the current until the solenoid core had returned to the position it assumes with the machine at rest.

The box which contains the switch and resistance coils may be covered with the door 200, so as to be entirely out of reach of the operator. The advantages of this elevator are that there can be no possibility of harm from overloading, for if the machine be overloaded beyond the safety limit the lever J will push the pin which operates the switch $R^2$ and close the current, and it will also regulate the speed, so that the weight multiplied by the speed will be a constant, and prevent overloading of the machine in the sense of affecting the source of power, and this is especially good where a constant overloading might cause an extra current to pass through the armature and burn it out. Thus in using a constant-potential circuit great care has to be taken to prevent overloading the machine. In case of overloading when the power is thrown on the machine a surplus current rushes through the armature, and if it is not protected by a fusible plug, burns it out. If there is a fusible plug, the said plug is blown out, and, while no serious damage results, yet the elevator stops, and there is the inconvenience of replacing the plug, which the elevator-boy could hardly be entrusted with, and, as is well known, especially with freight elevators, it is almost impossible to prevent overloading. As far as this device for measuring the load, as it were, is concerned, as hereinbefore stated, it is equally applicable to elevators driven by steam-power or by hydraulic power, and it can be arranged to be attached to other parts of the machine than that shown and gives the same results. If desired, an indicator can be placed in the car in connection with it—that is, as far as this weighing or measuring device is concerned. I do not intend to limit myself to any particular type of elevator, except wherein the said weighing device is specifically so claimed. By the arrangement of the solenoid and switch apparatus the introduction of the current is automatically regulated, and there can be no danger of a sudden influx of the current caused by carelessness on the part of the operator, as it is necessary for the current to pass into the motor gradually through the resistance coils until the motor has reached its maximum capacity. The speed is also under the control of the operator, as he is enabled to move the friction wheel D up and down upon the face of the friction-wheel C, thereby decreasing or increasing the speed as the load varies, so as to maintain a constant power.

By my mechanism I can start the machine with a reduced speed, and I thus do not require a heavier motor to start the apparatus than I need thereafter to operate it.

Instead of placing the switch adjacent to or in the resistance-box said switch might be placed in the car, and the wires could run direct from it to the resistance-box, the only difference being an increased length of wire.

This application is a division of the application for Reissue of Letters Patent, dated December 29, 1891, No. 466,037, said application being filed November 27, 1893, and serially numbered 492,154.

In this application I have claimed only the mechanical features of my invention, and in an application filed November 27, 1893, Serial No. 492,154, of which this is a division, I have claimed the electrical features of my invention.

Having now fully described my invention, what I claim, and desire to protect by Letters Patent, is—

1. In an elevator, in combination, a worm, a lever, connection between said lever and worm, whereby said lever is adapted to move with said worm, a tension device connected to said lever, and intermediate connection between said lever and the source of power, whereby when the movement of the worm exceeds the tension device the lever moves and shuts off the power.

2. In an elevator, in combination, a worm-shaft, a lever, one end connected to said shaft, so as to move with said shaft, a tension device connected to said lever, and intermediate connection between said lever and the source of power, whereby when the movement of the shaft exceeds the tension device the lever moves over and shuts off the power.

3. In an elevator, in combination, a worm, a lever, connection between said worm and lever, whereby said lever is adapted to move with said worm, spring acting against said lever, and intermediate connection between said lever and source of power, whereby when the movement of the shaft overcomes the spring the lever moves and shuts off the power.

4. In an elevator, in combination, a worm-shaft, a lever, one end connected to said shaft, so as to move with said shaft, a spring acting against said lever, and intermediate connection between said lever and the source of power, whereby when the movement of the shaft overcomes the spring acting against the lever said lever comes over and shuts off the power.

5. In combination, a power-shaft, a friction-wheel, driven by said shaft, an elevator driving-shaft, a friction-wheel upon said shaft in contact with the power-driving-shaft friction-wheel, an operating sheave, an operating-bar operated by said operating sheave, and intermediate connection between said bar and the power-shaft friction-wheel, whereby the power-shaft friction-wheel is adapted to be moved across the face of the elevator-shaft friction-wheel.

6. In combination, a power-shaft, a friction-wheel upon said shaft, an elevator-driving shaft, a friction-wheel upon said shaft, said friction-wheels being in contact with each other, a driving-worm, a lever, connection between said lever and the worm, whereby said lever is adapted to move with said worm, a resistance device connected to said lever, and intermediate connection between said lever and the friction-wheels, whereby the movement of the lever causes the position of the friction-wheels to vary with relation to each other.

7. In combination, a power-shaft, a friction-wheel driven by said shaft, an elevator driving-shaft, a friction-wheel upon said shaft, said friction wheels being in contact with each other, an operating-sheave, an operating-bar operated by said sheave, stops upon said bar, a driving-worm, a lever, connection between said lever and the worm, whereby said lever is adapted to move with said worm, a tension device connected to said lever, the end of said lever being in line of travel of the stops upon the operating bar, and intermediate connection between said bar and the friction wheels.

8. In combination, a power-shaft, a friction-wheel driven by said shaft, an elevator driving-shaft, a friction-wheel upon said shaft in contact with the power-driving-shaft friction-wheel, an operating-sheave, an operating-bar operated by said sheave, stops upon said bar, a lever, one end connected to the elevator driving-shaft, so as to be capable of moving with said shaft, the other end being in the line of travel of the stops upon operating-bar, and a tension device connected to said lever, and intermediate connection between the operating-bar and the power-driving-shaft friction-wheel.

9. In combination, an elevator car, a power-shaft, a friction-wheel driven by said shaft, an elevator-driving-shaft, a friction-wheel upon said shaft in contact with the power-driving-shaft friction-wheel, intermediate connection between elevator and power shaft, an operating-bar, intermediate connection between the bar and a device carried in said car, and intermediate connection between said bar and the power-shaft friction-wheel, whereby the power-shaft friction-wheel is adapted to be moved across the face of the elevator-shaft friction-wheel from the car.

10. In combination, an elevator-car, an operating-sheave, a driving-worm, mechanism to operate said worm, intermediate connection between said worm and sheave, a lever, connection between said lever and the worm, whereby the lever is adapted to be moved with the worm, an indicating device carried by the car, and intermediate connection between said lever and the indicating device, whereby the movement of the lever is indicated in the car.

11. In combination, an elevating apparatus, a power-shaft, a friction-wheel driven by said shaft, a driving-shaft, a friction wheel on said shaft in such position that its face rests against the power-shaft friction-wheel, a pivoted lever counterbalanced substantially as described, connected to said driving-shaft, and connection between said lever and the power-shaft friction-wheel, whereby when said lever swings out of its normal position the power-shaft friction-wheel is moved on the face of the driving-shaft friction-wheel.

12. In combination, an elevating apparatus, a driving-power adapted to drive said elevating apparatus, a pivoted lever counterbalanced and connected to the elevating apparatus, said lever being counterbalanced to the desired load and adapted when said load is increased to swing on its pivot-point, and intermediate connection between said lever and the source of power, whereby when the lever swings on its pivot-point the mechanism is stopped.

In testimony of which invention I have hereunto set my hand.

FRANK E. HERDMAN.

Witnesses:

ARTHUR BOYD,

HENRY E. TURNER.